United States Patent
Stern et al.

(10) Patent No.: US 11,689,929 B2
(45) Date of Patent: *Jun. 27, 2023

(54) CONTROLLING ACCESS TO ENTERPRISE CENTERS USING A DYNAMIC ENTERPRISE CONTROL SYSTEM

(71) Applicant: Bank of America Corporation, Charlotte, NC (US)

(72) Inventors: David Alan Stern, Wyckoff, NJ (US); Lauren Elizabeth Schuler, Charlestown, MA (US); Christopher Broome, Watkinsville, GA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,919

(22) Filed: Aug. 31, 2022

(65) Prior Publication Data

US 2022/0417751 A1 Dec. 29, 2022

Related U.S. Application Data

(63) Continuation of application No. 16/550,494, filed on Aug. 26, 2019, now Pat. No. 11,477,650.

(51) Int. Cl.
*H04W 12/086* (2021.01)
*G07C 9/00* (2020.01)
(Continued)

(52) U.S. Cl.
CPC ...... *H04W 12/086* (2021.01); *G07C 9/00182* (2013.01); *G07C 9/00571* (2013.01);
(Continued)

(58) Field of Classification Search
CPC .............................. H04W 4/029; H04L 63/07
See application file for complete search history.

(56) References Cited

U.S. PATENT DOCUMENTS

| 4,221,086 A | 9/1980 | Berman |
| 4,237,799 A | 12/1980 | Berman |

(Continued)

FOREIGN PATENT DOCUMENTS

| EP | 2898652 B1 | 3/2019 | |
| EP | 3245806 B1 * | 9/2019 | ........... G06F 21/316 |
| WO | 2014047168 A1 | 3/2014 | |

OTHER PUBLICATIONS

Duong, Tony, et al; IBM MobileFirst Strategy Software Approach; IBM.com/redbooks; International Technical Support Organization; May 2014.

*Primary Examiner* — William D Cumming
(74) *Attorney, Agent, or Firm* — Banner & Witcoff, Ltd.

(57) ABSTRACT

Arrangements for dynamic enterprise center access control are provided. In some examples, a user device may be detected and current location and/or user data associated with the detected device may be requested. Upon receiving the location data, a current geographic location of the user device may be determined and an enterprise center at or near the geographic location may be identified. Received user data may be analyzed to identify a user and retrieve access preferences associated with the user. Based on the access preferences, a command to lock or unlock a door (e.g., permit or disable access) to an area within the enterprise center, the enterprise center in general, or the like, may be generated and transmitted to a computing device for execution. Accordingly, the system may activate desired locking configurations based on user preferences. Upon detecting that the user is no longer at the enterprise center, a command to return to default settings may be generated, transmitted and executed.

21 Claims, 12 Drawing Sheets

(51) Int. Cl.
*H04W 4/021* (2018.01)
*H04W 64/00* (2009.01)
*H04W 4/029* (2018.01)
*H04L 67/306* (2022.01)
*H04L 9/40* (2022.01)

(52) U.S. Cl.
CPC .......... *H04L 63/107* (2013.01); *H04L 67/306* (2013.01); *H04W 4/021* (2013.01); *H04W 4/029* (2018.02); *H04W 64/003* (2013.01)

(56) References Cited

U.S. PATENT DOCUMENTS

| | | | |
|---|---|---|---|
| 4,380,201 | A | 4/1983 | Dion |
| 4,656,954 | A | 4/1987 | Tonali |
| 4,928,429 | A | 5/1990 | Colombo |
| 5,311,166 | A | 5/1994 | Frye |
| 7,840,647 | B2 | 11/2010 | Kloba et al. |
| 7,995,791 | B2 | 8/2011 | Flook et al. |
| 10,033,819 | B2 | 7/2018 | Thanayankizil |
| 10,149,133 | B2 | 12/2018 | Scagnol et al. |
| 10,157,537 | B1 | 12/2018 | Coxwell |
| 10,511,943 | B2 | 12/2019 | Venkatraman et al. |
| 11,477,650 | B2 * | 10/2022 | Stern .................. G07C 9/00182 |
| 2013/0264386 | A1 | 10/2013 | Greenspan |
| 2016/0048408 | A1 | 2/2016 | Madhu et al. |
| 2017/0344965 | A1 | 11/2017 | Watson et al. |
| 2021/0067969 | A1 * | 3/2021 | Stern .................... H04W 4/029 |
| 2022/0046047 | A1 | 2/2022 | Lewis |
| 2022/0417751 | A1 * | 12/2022 | Stern .................... H04L 63/107 |

* cited by examiner

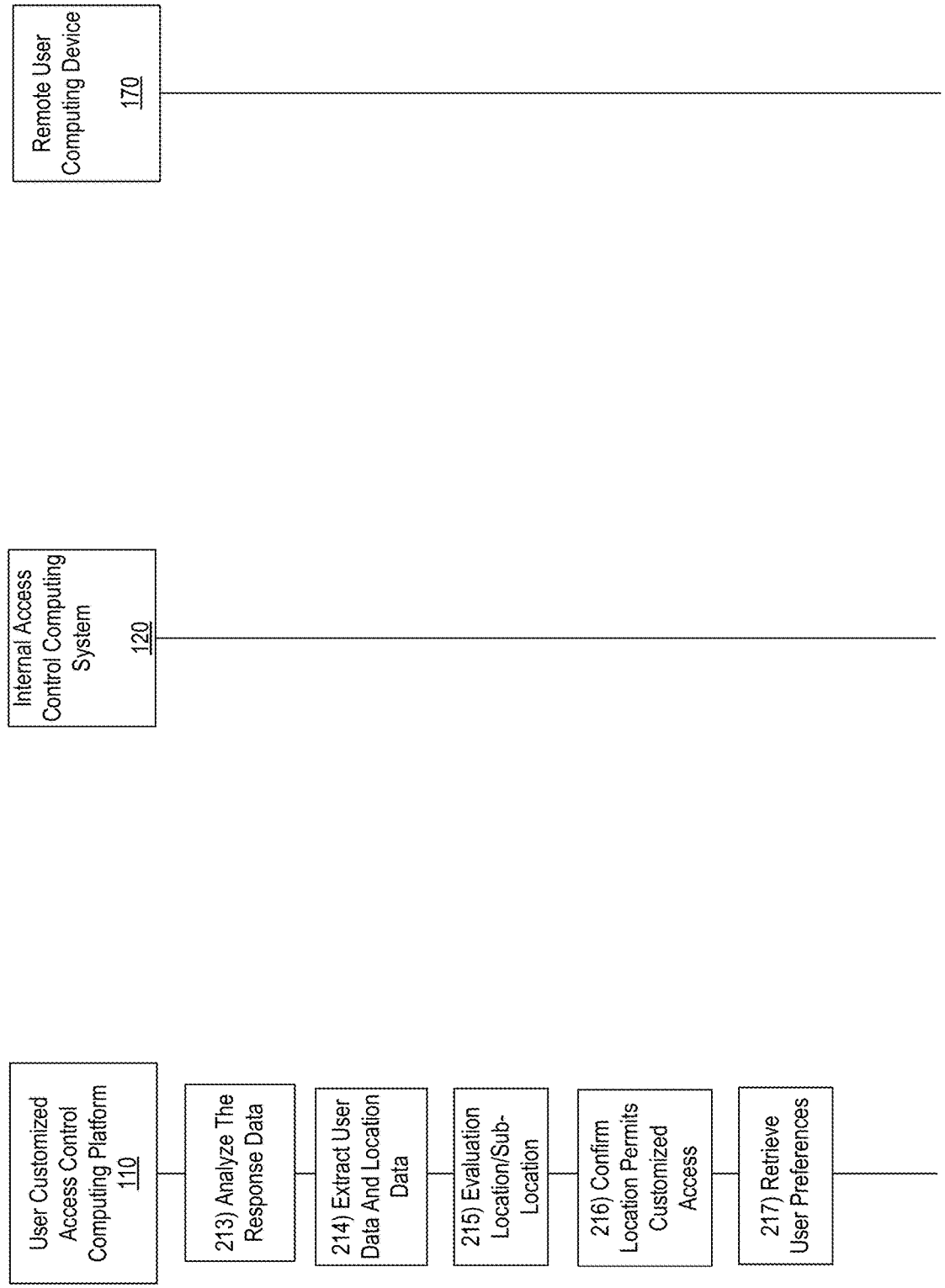

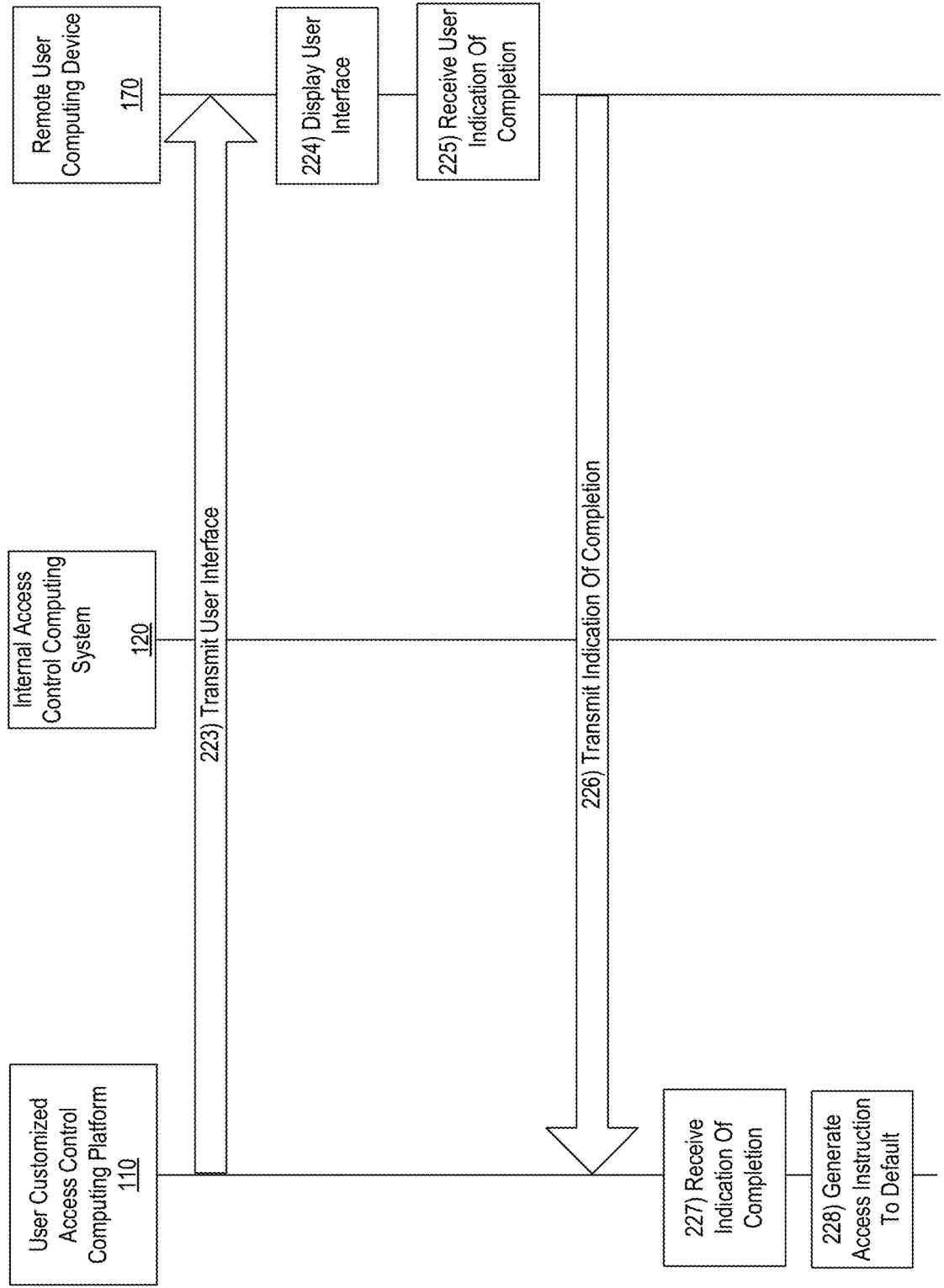

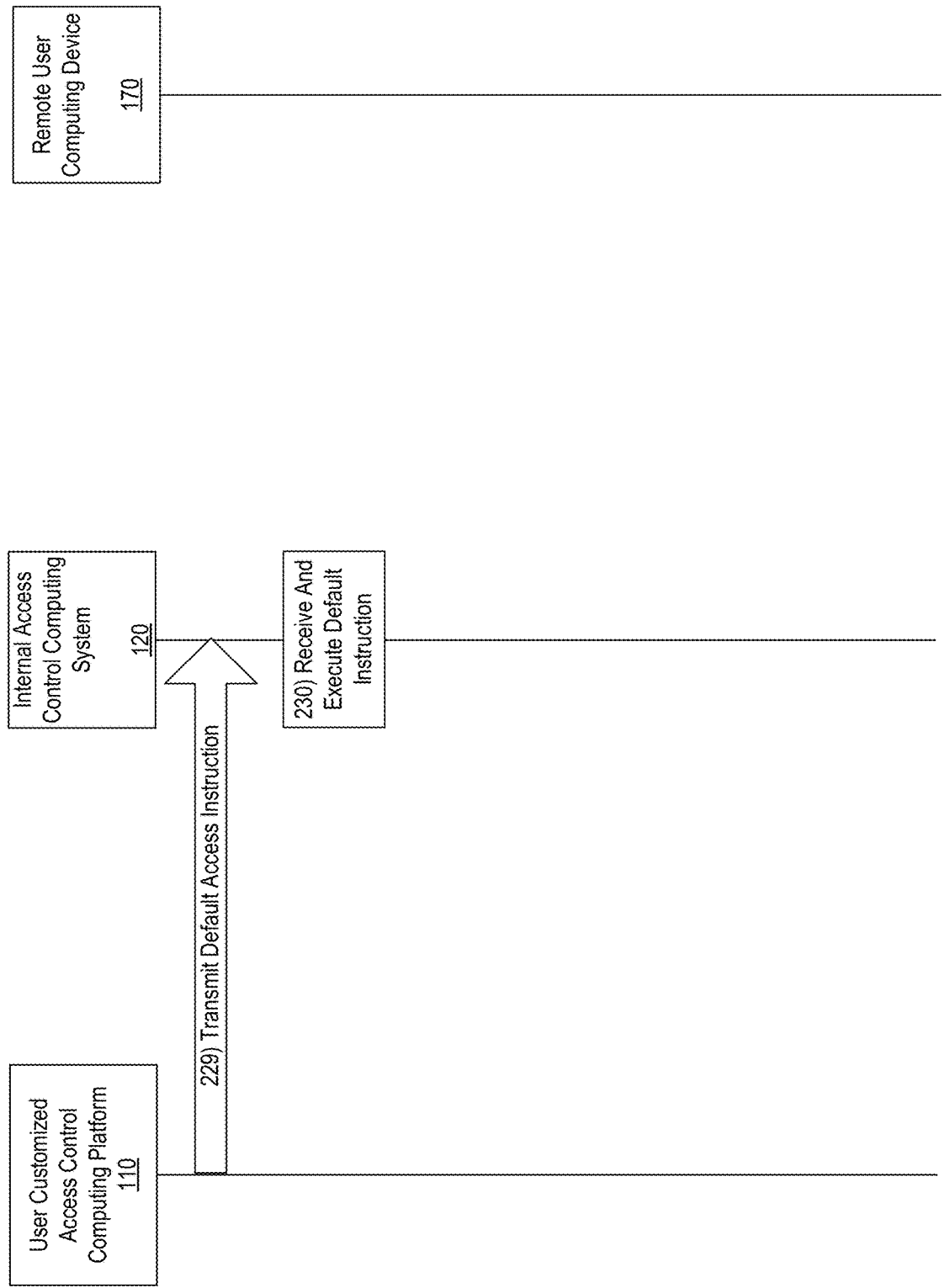

CONTROLLING ACCESS TO ENTERPRISE CENTERS USING A DYNAMIC ENTERPRISE CONTROL SYSTEM

CROSS REFERENCE TO RELATED APPLICATIONS

This application is a continuation of and claims priority to co-pending U.S. application Ser. No. 16/550,494, filed Aug. 26, 2019, and entitled "Controlling Access to Enterprise Centers Using a Dynamic Enterprise Control System," which is incorporated herein by reference in its entirety.

BACKGROUND

Aspects of the disclosure relate to electrical computers, systems, and devices for identifying and executing dynamic enterprise center access controls. In particular, one or more aspects of the disclosure relate to controlling access to enterprise centers using a dynamic enterprise control system.

Personal security and privacy is important to consumers. However, each person may have different expectations for maintaining privacy at different types of locations. Many locations use default security or privacy settings which may be sufficient but might not meet expectations of all consumers. Accordingly, it would be advantageous to provide a system for enabling customized access controls that may be dynamically executed to aid in maintaining personal privacy and security.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing dynamic, customized control of access to enterprise centers.

In some examples, one or more users may register with a system. Registering with the system may include providing user information, device information, and access control preferences for each user. After registering with the system, a registered user device may be detected (e.g., by signals emitted from the user device) and current location and/or user data associated with the detected device may be requested.

Upon receiving the location data, a current geographic location of the user device may be determined and an enterprise center at or near the geographic location may be identified. A type of enterprise center may be identified and it may be confirmed that the enterprise center or type of enterprise center permits customized user access controls.

Upon confirming that the enterprise center or type of enterprise center permits customized user access controls, user data may be analyzed to identify a user and retrieve access preferences associated with the user. Based on the access preferences, an instruction, signal or command to lock or unlock a door (e.g., permit or disable access) to an area within the enterprise center, the enterprise center in general, or the like, may be generated and transmitted to a computing device for execution. Accordingly, the system may activate desired locking configurations based on user preferences. Upon detecting that the user is no longer at the enterprise center, an instruction, signal or command to return to default settings may be generated, transmitted and executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing user customized access control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic control of access to one or more enterprise centers, or locations or areas within an enterprise center. As discussed above, information privacy and personal security are concerns for customers of various businesses. The ability to customize access controls for a particular user may provide additional security and peace of mind for a user.

Accordingly, as discussed herein, aspects are directed to dynamically controlling access to one or more enterprise centers or areas within an enterprise center. A user's location may be determined and an enterprise center at the location may be identified. In some examples, user access preferences may be retrieved and executed to activate or actuate one or more locks in order to enable to disable access to an area via one or more doors or other access devices. Upon leaving the enterprise center, the access controls may be returned to default settings.

These and various other arrangements will be discussed more fully below.

Figure 1A:
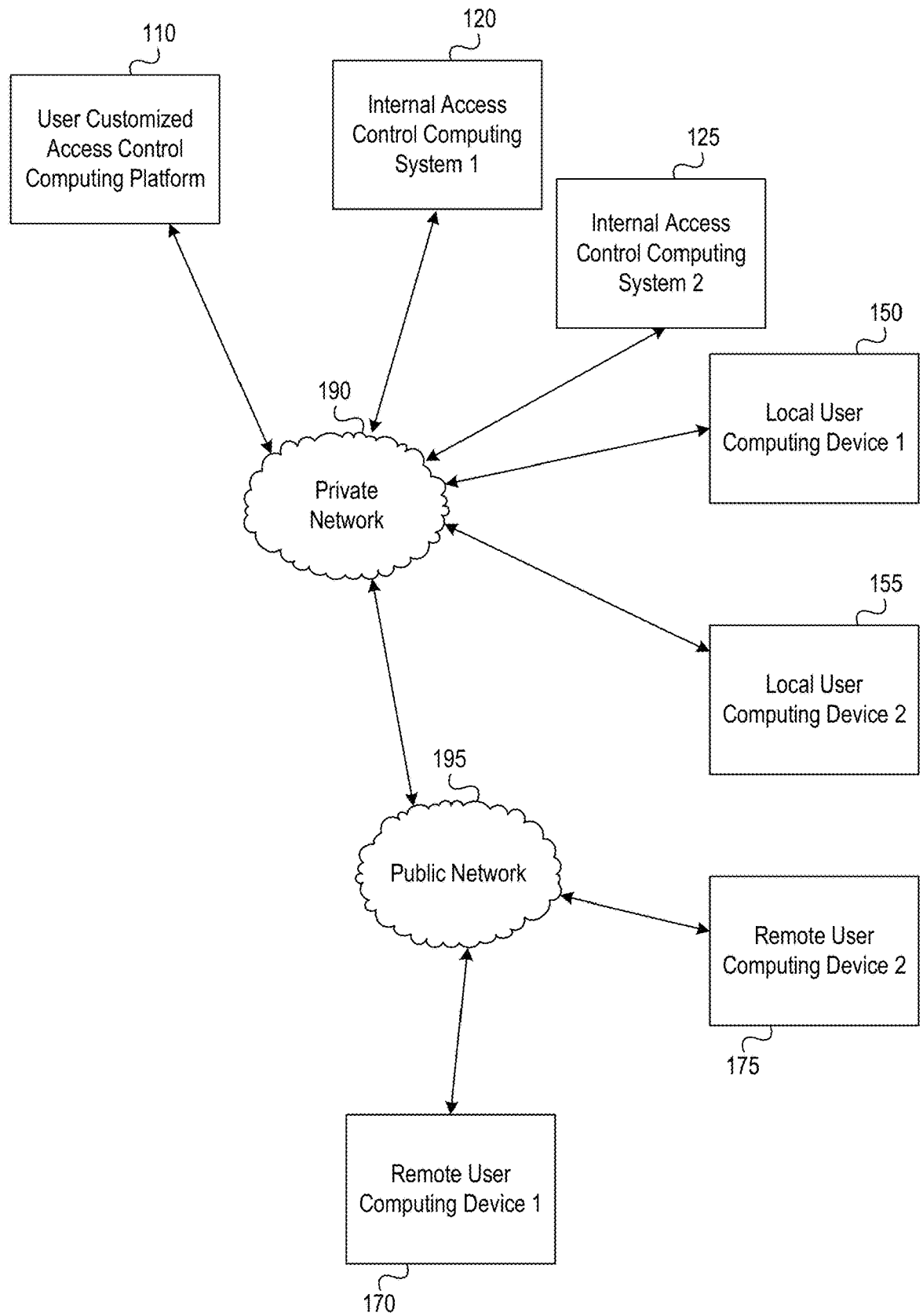
FIGS. 1A and 1B depict an illustrative computing environment for implementing user customized access control functions in accordance with one or more aspects described herein.
Figure 1B:
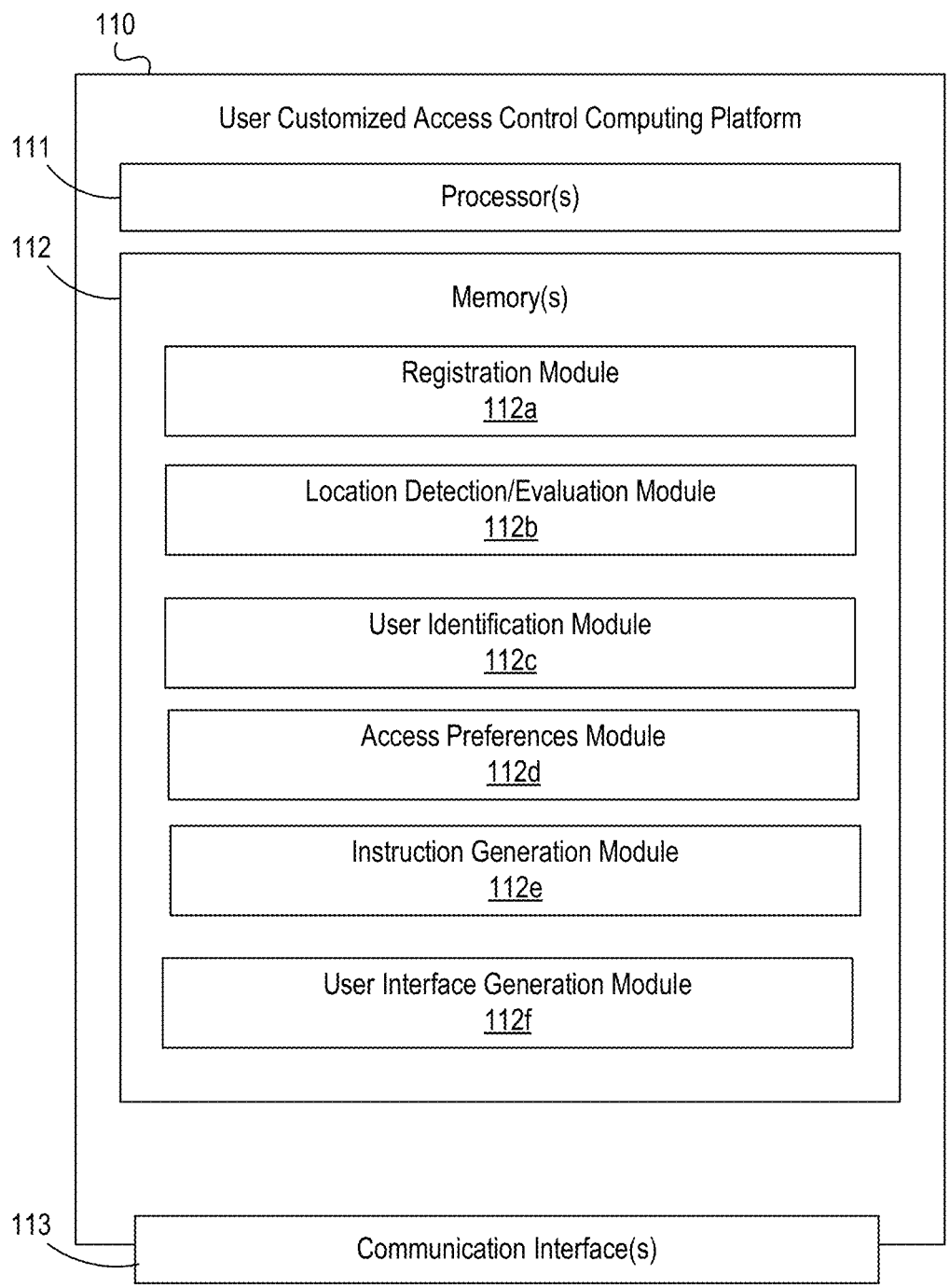

FIGS. 1A-1C depict an illustrative computing environment for implementing and using a system for dynamic, customized access control in accordance with one or more aspects described herein. Referring to FIG. 1A, computing environment 100 may include one or more computing devices and/or other computing systems. For example, computing environment 100 may include user customized access control computing platform 110, a first internal access control computing system 120, a second internal access control computing system 125, a first local user computing device 150, a second local user computing device 155, a first remote user computing device 170, and a second remote user computing device 175. Although two internal access control computing systems are shown in FIG. 1A, more or fewer computing systems may be used without departing from the invention.

User customized access control computing platform 110 may be configured to provide intelligent, dynamic customized access control. In some examples, the user customized access control computing platform 110 may detect a user device. For instance, short-range wireless communications such as Bluetooth™, WiFi, or other technology may be used to detect a user device, such as a mobile computing device, smartphone, laptop computer, tablet computer, or the like. In some examples, detecting the device may include receiving device identifying information and/or user identifying information. Additionally or alternatively, the user customized access control computing platform 110 may generate a request for user information and/or device information and may transmit the request to the detected device.

Upon receiving data from the user device, the user customized access control computing platform 110 may identify device identifying information and user identifying information. In some examples, the user customized access control computing platform 110 may determine a current location of the user device (and, consequently, the user). For instance, global navigation satellite systems (GNSS), such as global positioning systems (GPS), or the like, may be used to capture location information from the mobile device. Additionally or alternatively, a detecting device, such as a location beacon, may be positioned at a particular location and location data may be determined based on detection of the location beacon by the user device.

In some examples, the location data may be first location data and may provide a geographic location of a user (e.g., address, intersection, longitude and latitude, or the like). In some arrangements, a second location, at a more granular level may be determined. For instance, one or more location beacons may be arranged within a structure. Accordingly, upon detection of a location beacon by the user device (or vice versa), a more granular position of the user device (and user) within the structure may be determined. This second location data may be used to identify and initiate one or more customized user access controls, as will be discussed more fully herein.

The user customized access control computing platform 110 may, based on at least the first location data, determine whether the detected location (e.g., first location) is eligible for customized access controls. If not, a notification may be transmitted to the user device and the process may end. If so, the identified user information may be used to retrieve one or more pre-stored access control preferences. For instance, a user within a structure including a self-service kiosk and an additional enclosed room for having further conferences to interaction with an agent via real-time video streaming may identify a preference that, when within the enclosed room, the door should be locked to users from the outside but the user within the room may be able to open the door from the inside. In some examples in which a user is in a vestibule having a single self-service kiosk (e.g., automated teller machine (ATM)), the user may identify a preference that the door to the vestibule may remain locked to users outside the vestibule (e.g., even to users with permission to enter (e.g., an ATM card, or the like), but the user inside the vestibule may be able to open the door from the inside. Accordingly, even users authorized to access the vestibule may be prevented from accessing the vestibule until the user is finished, based on the user preferences. Various other preferences may be pre-stored without departing from the invention.

Upon retrieving the user preferences, the user customized access control computing platform 110 may evaluate the location of the user (e.g., type of location, number of locks, arrangement of locks, and the like) and may generate one or more instructions, commands or signals to activate or actuate one or more mechanical or electronic locks at the location (e.g., first location, second location within the first location, or the like). The instruction, command or signal may be transmitted to an internal access control computing system 120, 125 (or the like) located at the location which may execute the instruction, command or signal to activate or actuate the locks. In some examples, internal access control computing systems 120, 125 may be omitted and the user customized access control computing platform 110 may directed activate or actuate the one or more locks.

In some examples, the user customized access control computing platform 110 may further generate one or more notifications to the user indicating that user access preferences have been initiated or activated. Accordingly, the user may be notified (e.g., via the user device) that his or her preferences have been activated and may know that particular doors are locked or unlocked, as desired, based on the pre-stored preferences.

Internal access control computing system 120 and internal access control computing system 125 may be computing systems associated with (e.g., operated by, owned by, or the like) the entity implementing the user customized access control computing platform 110. Internal access control computing system 120, internal access control computing system 125, and the like, may include one or more desktop computers, laptop computers, servers, and the like. In some examples, internal access control computing system 120 and/or internal access control computing system 125 may store data and/or execute processes to control access to a location and/or area (e.g., within a location). In some examples, internal access control computing system 120 and/or internal access control computing system 125 may be a self-service kiosk, such as an ATM, a video agent device enabling real-time video communication between a user and an agent, or the like. Accordingly, the internal access control computing system 120, and/or internal access control computing system 125 may perform multiple functions at a particular area or location and, in some examples, may be configured to activate or initiate one or more access controls, such as activating or actuating a mechanical or electronic lock. In some examples, activating and/or actuating a mechanical or electronic lock may include executing an instruction to actuate the lock, executing an instruction to magnetize or demagnetize a device maintaining position of a lock, or the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the user customized access control computing platform 110 to control parameters of the system, update or execute rules, modify settings, and the like. In some arrangements, one or more of local user computing device 150, local user computing device 155, remote user computing device 170, and/or remote user computing device 175 may be used to receive notifications, display one or more interactive user interfaces or dashboards, receive user input requesting modifications, and the like.

The remote user computing device 170 and remote user computing device 175 may be used to communicate with, for example, user customized access control computing platform 110. For instance, remote user computing devices 170, 175 may include user computing devices, such as mobile devices including smartphones, tablets, laptop computers, and the like, that may detect or be detected by the user customized access control computing platform 110 (and/or device associated therewith) to determine location, identify a user and/or device, display notifications, and the like. In some examples, remote user computing device 170 and/or remote user computing device 175 may be used to register a user or device with the system or entity implementing the user customized access control computing platform 110, provide user and/or device information, provide user access control preferences, and the like.

In one or more arrangements, internal access control computing system 120, internal access control computing system 125, local user computing device 150, local user computing device 155, remote user computing device 170, and/or remote user computing device 175 may be any type of computing device or combination of devices configured to perform the particular functions described herein. For example, internal access control computing system 120, internal access control computing system 125, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal access control computing system 120, internal access control computing system 125, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include user customized access control computing platform 110. As illustrated in greater detail below, user customized access control computing platform 110 may include one or more computing devices configured to perform one or more of the functions described herein. For example, user customized access control computing platform 110 may include one or more computers (e.g., laptop computers, desktop computers, servers, server blades, or the like).

As mentioned above, computing environment 100 also may include one or more networks, which may interconnect one or more of user customized access control computing platform 110, internal access control computing system 120, internal access control computing system 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, user customized access control computing platform 110, internal access control computing system 120, internal access control computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect user customized access control computing platform 110, internal access control computing system 120, internal access control computing system 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., user customized access control computing platform 110, internal access control computing system 120, internal access control computing system 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., user customized access control computing platform 110, internal access control computing system 120, internal access control computing system 125, local user computing device 150, local user computing device 155).

Referring to FIG. 1B, user customized access control computing platform 110 may include one or more processors 111, memory 112, and communication interface 113. A data bus may interconnect processor(s) 111, memory 112, and communication interface 113. Communication interface 113 may be a network interface configured to support communication between user customized access control computing platform 110 and one or more networks (e.g., private network 190, public network 195, or the like). Memory 112 may include one or more program modules having instructions that when executed by processor(s) 111 cause user customized access control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of user customized access control computing platform 110 and/or by different computing devices that may form and/or otherwise make up user customized access control computing platform 110.

For example, memory 112 may have, store and/or include a registration module 112a. Registration module 112a may store instructions and/or data that may cause or enable the user customized access control computing platform 110 to receive registration information from one or more users, devices, or the like. For instance, a user may register himself or herself (e.g., provide identifying information, contact information, authentication credential information, and the like), as well as his or her device (e.g., provide identifying information (e.g., MAC address, IMEI, phone number, or the like). The data may be received from a user device, such as remote user computing device 170 and/or remote user computing device 175. In some examples, a user may register more than one device (e.g., a smartphone as well as a tablet computer, laptop computer, smartwatch or other wearable device, or the like). The registration module 112a may also receive user preference data. For instance, once the user is registered, the user may be prompted to input, via one or more interactive user interfaces, one or more user preferences for access control, such as how and/or when doors should be locked in different locations or types of locations, and the like). The registration module 112a may then store this data in a database by generating a new record in the database.

User customized access control computing platform 110 may further have, store and/or include location detection/ evaluation module 112b. Location detection/evaluation module 112b may store instructions and/or data that may cause or enable the user customized access control computing platform 110 to detect a location of a user device, such as a registered mobile or other user device associated with a registered user. In some examples, detecting the location of the user device may include detecting, based on an emitted Bluetooth™, WiFi, or other signal, the user device. In some arrangements, a signal from the user device may be detected by the location detection/evaluation module 112b while, in other arrangements, the user device may detect a signal emitted from the location detection/evaluation module 112b and may send a response signal that may be detected by the location detection/evaluation module 112b.

Upon detecting the user device, the location detection/ evaluation module 112b may analyze a signal detected and/or associated data to determine a location of the user. In some examples, the location may be determined based on the device being within a predefined proximity of the location detection/evaluation module 112b or other device detecting signals and in communication with location detection/evaluation module 112b. For instance, internal access control computing systems 120 and/or 125 may be arranged at various locations and may detect user devices and communicate the detection of the devices to the location detection/evaluation module 112b. Because a signal may be detected within a predefined range, the location of the user device may be determined based on the signal being detected within the range.

In some examples, detection of the user device may cause a request for location information to be transmitted to the user (e.g., request for GPS or other location data). The user device may then generate and send location response data to the location detection/evaluation module 112b and the location detection/evaluation module 112b may then determine a location of the user device based on the location response data.

Once the location data is determined, a type of enterprise center location may be determined. For instance, an entity or enterprise implementing the user customized access control computing platform 110 may include or be comprised of a plurality of enterprise centers. Each enterprise center may be at a particular geographic location and may include a plurality of sub-locations within the enterprise center or within the determined geographic location. In some examples, an enterprise center or type of enterprise center may include a branch or office of the entity or enterprise, a vestibule having at least one ATM or other self-service kiosk therein, an advanced center that may include one or more areas or interior rooms having closing and/or locking doors or other access devices for privacy and may include one or more ATMs or other self-service kiosks, conference rooms, video-chat enabled rooms, and the like, as well as other types of centers.

Accordingly, upon determining the location of the user device, an enterprise center at the location may be identified and a type of enterprise center may be determined. Based on the type of enterprise center, the location detection/evaluation module 112b may determine whether customized user access preference may be implemented at the enterprise center, or whether default access controls will be implemented. This determination may be based on a number of self-service kiosks in a vestibule or area, a configuration of the enterprise center or type of enterprise center, or the like.

In some examples, the sub-location within the location may be determined (e.g., based on location beacons arranged in various parts of the enterprise center) and the sub-location may also be used in identifying user preferences.

User customized access control computing platform 110 may further have, store and/or include a user identification module 112c. The user identification module 112c may store instructions and/or data that may cause or enable the user customized access control computing platform 110 to identify, based on data received from the user device, a user associated with the user device. For instance, a unique identifier or other data received from the user device upon detection of the user device (and/or in response to a request for data from the user device) may be received and analyzed to identify a user associated with the device. For instance, the user identification module 112c may receive the device or device identifying information and may use that as input in a query to look up (e.g., in a lookup table in a database) the associated user.

Based on the identified user, pre-stored user preferences associated with the user may be identified. For instance, the identified user may be used to query data stored in the access preferences module 112d. Access preferences module 112d may store instructions and/or data that may cause or enable the user customized access control computing platform 110 to retrieve pre-stored user preferences, such as access preference, from a database. In some examples, the user access preferences may be identified for each type of enterprise center. Accordingly, in some examples, identifying or retrieving user preferences by the access preference module 112d may include identifying the type of enterprise center at the user's current location.

User customized access control computing platform 110 may further have, store and/or include an instruction generation module 112e. Instruction generation module 112e may store instructions and/or data that may cause or enable the user customized access control computing platform 110 to generate one or more instructions, signals, or commands to activate or actuate a lock on a door or other access device based on the retrieved user access preferences. For instance, a user may desire to have a conference room door in a first type of enterprise center, such as an advance center, lock or prevent access to a person outside the room while the user is within the conference room. In at least some arrangements, the conference room door may include a unidirectional lock that always permits a user to exit the room through the door (e.g., the door is not locked to a user inside the conference room). Various other preference may be identified for the user.

Accordingly, based on the user preferences, type of enterprise center, and/or sub-location of the user within the enterprise center, the instruction generation module 112e may generate and transmit (e.g., to a lock or locking device at the enterprise center, to a computing device, such as internal access control computing system 120 located at the enterprise center, or the like), the instruction, command or signal causing the lock to activate or actuate in order to initiate the user access preferences.

User customized access control computing platform 110 may further have, store and/or include a user interface generation module 112f. User interface generation module 112f may store instructions and/or data that may cause or enable the user customized access control computing platform 110 to generate one or more interactive user interfaces that may notify a user that one or more user preferences have or have not been activated or initiated. In some examples, user interface generation module 112f may generate one or more interactive user interfaces that may be transmitted to the user device to capture registration information, receive user access preferences, and the like.

FIGS. 2A-2F depict one example illustrative event sequence for implementing and using user customized access control functions in accordance with one or more aspects described herein. The events shown in the illustrative event sequence are merely one example sequence and additional events may be added, or events may be omitted, without departing from the invention.

Figure 2A:
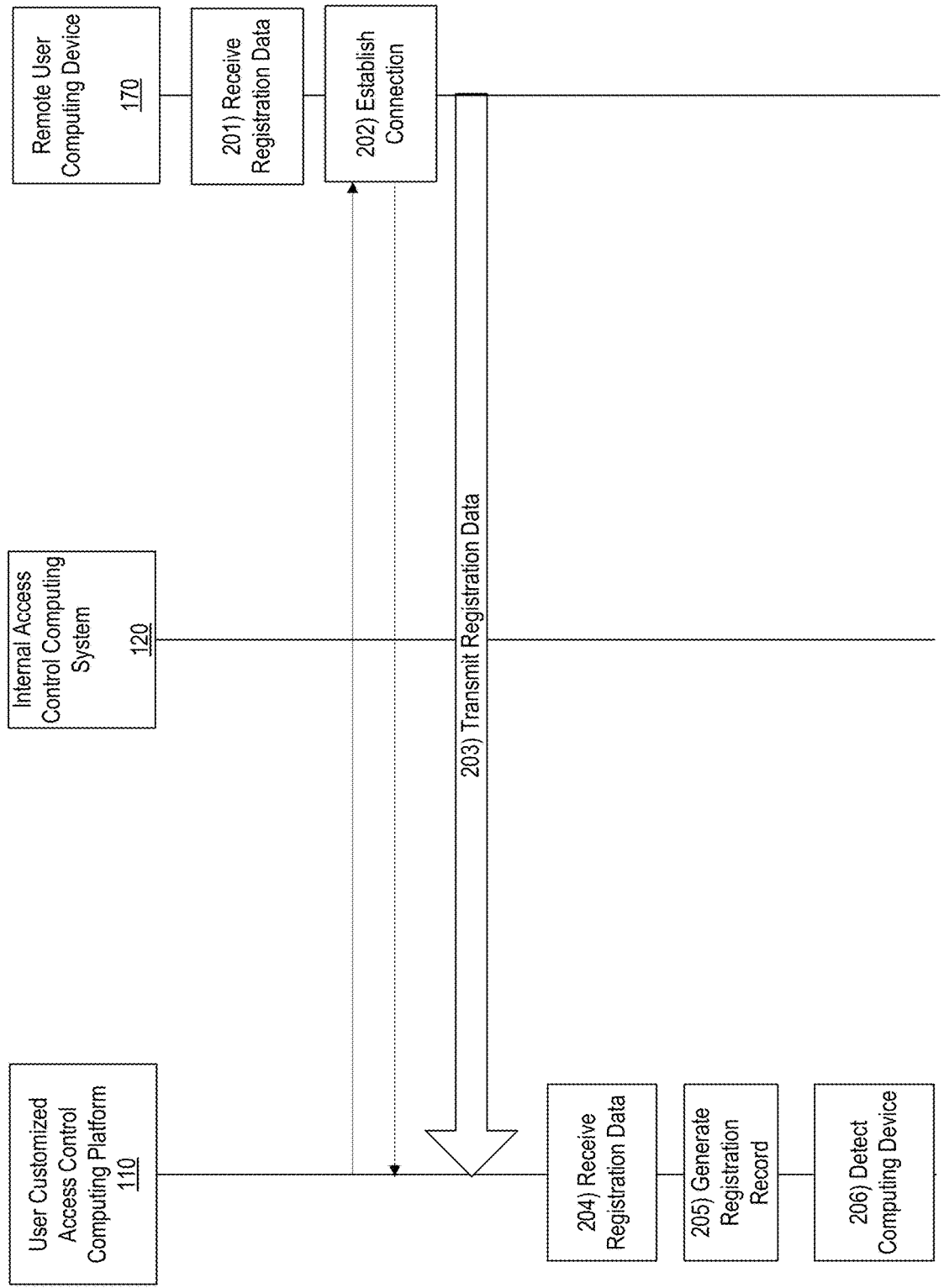

Referring to FIG. 2A, at step 201, registration data may be received. For instance, one or more a user may provide, via, for example, a user computing device such as remote user computing device 170, registration information. The registration information may include, for example, user identifying name, user login credentials (e.g., username and password or personal identification number (PIN), biometric data, and the like), user contact information, and the like. In some examples, the registration information may include data or information associated with one or more user devices, such as remote user computing device 170. For instance, device identifying information, a phone number, or the like, may be provided.

In some arrangements, the registration information may also include user access control preferences. For instance, as discussed herein, a user may pre-store access preferences for one or more types of enterprise centers. Accordingly, that information may be received by the remote user computing device 170 from the user (e.g., via user input into one or more interactive user interfaces).

At step 202, a connection may be established between the remote user computing device 170 and user customized access control computing platform 110. For instance, a first wireless connection may be established between the remote user computing device 170 and the user customized access control computing platform 110. Upon establishing the first wireless connection, a communication session may be initiated between the remote user computing device 170 and the user customized access control computing platform 110.

At step 203, the registration data may be transmitted from the remote user computing device 170 to the user customized access control computing platform 110. For instance, the registration data may be transmitted during the communication session initiated upon establishing the first wireless connection.

At step 204, the registration data may be received by the user customized access control computing platform 110. At step 205, a registration record may be generated. For instance, a database may be modified to include a new registration record including the received registration data to be stored.

At step 206, a user computing device may be detected. For instance, the user customized access control computing platform 110 (either directly or via one or more connected devices, such as internal access control computing system 120, or the like), may detect a signal from a user computing device, such as remote user computing device 170. In some examples, the detected signal may be a signal emitted from the remote user computing device 170. Additionally or alternatively, the signal maybe a signal transmitted in response to a signal emitted from the user customized access control computing platform 110 or connected device.

Figure 2B:
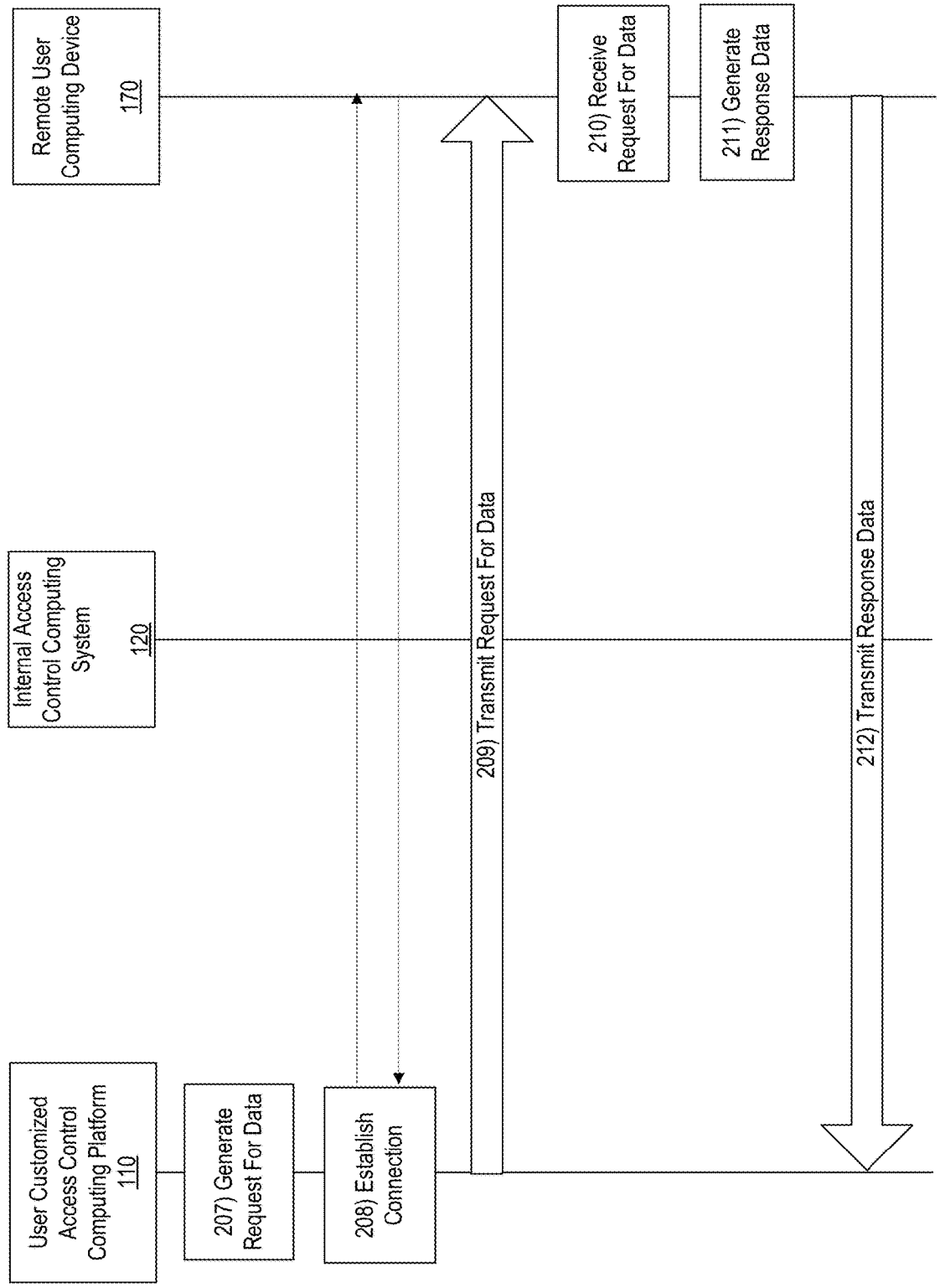

With reference to FIG. 2B, at step 207, a request for data may be generated. For instance, a request for location data, device identifying data, user data, and the like, may be generated.

At step 208, a connection may be established between the user customized access control computing platform 110 and the remote user computing device 170. For instance, a second wireless connection may be established between the user customized access control computing platform 110 and the remote user computing device 170. In some examples, the first wireless connection may be terminated upon receiving the registration data and the second wireless connection may be established after terminating the first wireless connection. Upon establishing the second wireless connection, a communication session may be initiated between the remote user computing device 170 and the user customized access control computing platform 110.

At step 209, the generated request for data may be transmitted from the user customized access control computing platform 110 to the remote user computing device 170. For instance, the request for data may be transmitted during the communication session initiated upon establishing the second wireless connection.

At step 210, the request for data may be received by the remote user computing device 170. At step 211, response data may be generated by the remote user computing device. For instance, response data including device identifying information, user identifying information, and/or current location information (e.g., based on one or more sensors, GPS, or the like) may be extracted and response data including the extracted data may be generated. In some examples, the generated response data may include not only a general geographic location of the user device, but also a sub-location of the user device within the location (e.g., based on detection of a signal emitted from a location beacon at an enterprise center located at the location).

At step 212, the generated response data may be transmitted from the remote user computing device 170 to the user customized access control computing platform 110.

With reference to FIG. 2C, at step 213, the response data may be received and analyzed by the user customized access control computing platform 110. At step 214, based on the analysis, user identifying data and/or current location data of the user's mobile device (and, consequently, the user) may be extracted.

At step 215, the location and/or sub-location of the user device may be analyzed to determine a type of enterprise center at the location. For instance, geographic coordinates, an address, or the like, may be identified based on the location information and compared to a stored list of enterprise centers and associated geographic locations, addresses, and the like. Based on the comparing, an enterprise center at the determined location may be identified and evaluated. For instance, a type of enterprise center may be determined, access rules associated with the enterprise center may be evaluated, and the like.

Based on, for example, the type of enterprise center and the access rules associated therewith, at step 216, the user customized access control computing platform 110 may determine and/or confirm that user customized access controls are permitted at the enterprise center at the determined location. If not, a notification may be generated and transmitted to the user.

If so, at step 217, one or more pre-stored user access preferences may be retrieved. For instance, the user identifying information, as well as the determined type of enterprise center, may be used to retrieve one or more pre-stored user access preferences.

Figure 2D:
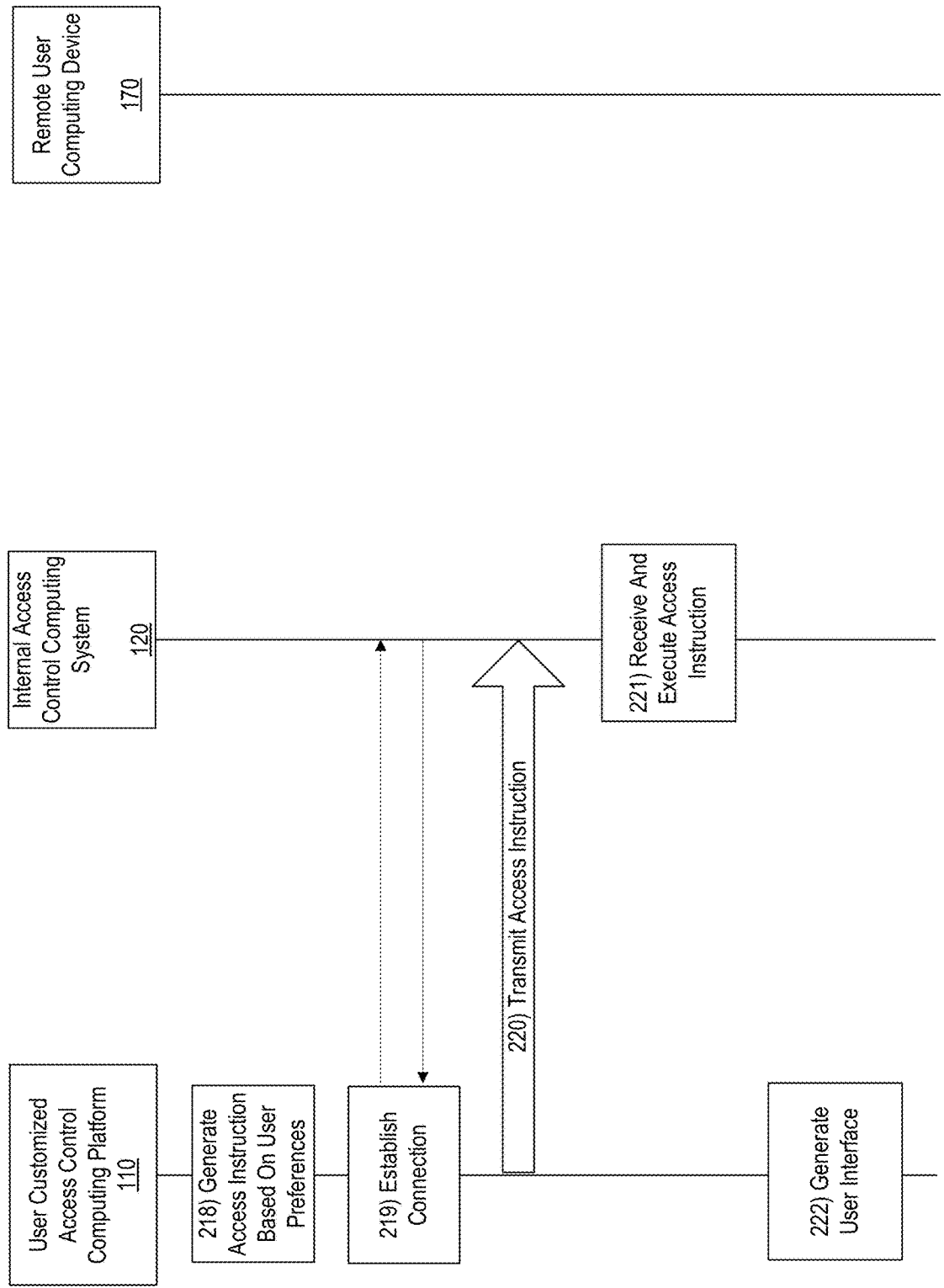

With reference to FIG. 2D, at step 218, based on the retrieved user preferences, an instruction, signal or command to activate and/or actuate one or more locks or locking devices on a door may be generated. The instruction, signal or command may include an instruction to engage a lock or prevent one or more unauthorized users from entering an area while the first user (whose preferences are activated) is within the enterprise center or portion of the enterprise center.

At step 219, a connection may be established between the user customized access control computing platform 110 and an internal access control computing system 120 at the enterprise center. As discussed herein, the internal access control computing system 120 may be part of another computing device, such as an ATM or self-service kiosk, a video chat hosting device, an associate computing device, or the like. In some examples, the internal access control computing system 120 may be a separate device from the other devices at the enterprise center. The wireless connection may be a third wireless connection and may be established between the user customized access control computing platform 110 and the internal access control computing system 120. Upon establishing the third wireless connection, a communication session may be initiated between the internal access control computing system 120 and the user customized access control computing platform 110.

At step 220, the generated access instruction, command or signal may be transmitted from the user customized access control computing platform 110 to the internal access control computing system 120. At step 221, the instruction, signal or command may be received and executed by the internal access control computing system 120. Executing the access instruction, command or signal may cause one or more locks or locking devices on one or more doors or other access devices to activate or deactivate (e.g., engage or disengage) depending on the retrieved user preferences.

Figure 3:
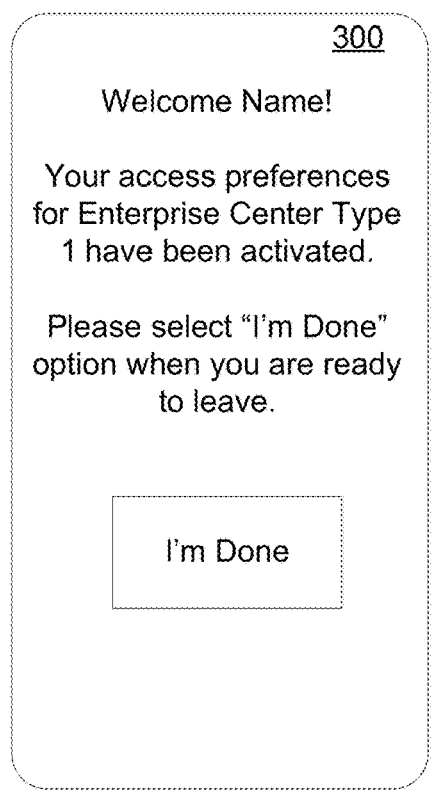
FIG. 3 illustrates one example user interface that may be generated according to one or more aspects described herein.

At step 222, a user interface may be generated by the user customized access control computing platform 110. The user interface may include an indication or notification that the user's pre-stored preferences have been activated. In some examples, the user interface may include an option for the user to select when the user has completed his or her time at the enterprise center and will be leaving. FIG. 3 illustrates one examples user interface 300 that may be generated by the user customized access control computing platform 110. The user interface 300 includes an indication that the user's access preferences have been activated. In addition, it includes a selectable option for the user to indicate that he or she is finished at the enterprise center and will be leaving.

With reference to FIG. 2E, at step 223, the generated user interface may be transmitted from the user customized access control computing platform 110 to the remote user computing device 170. At step 224, the user interface may be received by the remote user computing device 170 and displayed on a display of the remote user computing device 170.

At step 225, an indication of user completion may be received. In some examples, the user indication of completion may include response data generated upon user input selecting an option from an interactive user interface (such as "I'm Done" option in FIG. 3). Additionally or alternatively, the indication of completion may include termination of an established wireless connection between the user customized access control computing platform 110 and the remote user computing device 170 (such as second wireless connection, or the like), a scan of an area no longer detecting the remote user computing device 170, or the like, which may be received directly by the user customized access control computing platform 110 at step 227.

At step 226, a user indication of completion (e.g., received by the remote user computing device 170) may be transmitted from the remote user computing device 170 to the user customized access control computing platform 110. In some examples, the indication of completion may be transmitted during the communication session initiated upon establishing the second wireless connection. In other examples, another wireless connection may be established prior to transmitting the indication of completion. At step 227, the indication of completion may be received by the user customized access control computing platform 110.

At step 228, the indication of completion may be analyzed and an instruction, command or signal to return the access controls to a default setting may be generated. For instance, upon receiving an indication that the user is leaving, the system may default to standard locking, unlocking, or other access preferences until another registered user is detected.

With reference to FIG. 2F, at step 229, the generated instruction, command or signal to return to default settings may be transmitted to the internal access control computing system 120. At step 230, the instruction, command or signal may be received and executed by the internal access control computing system 120 and one or locks or other access parameters may be returned to a default setting.

Figure 4:
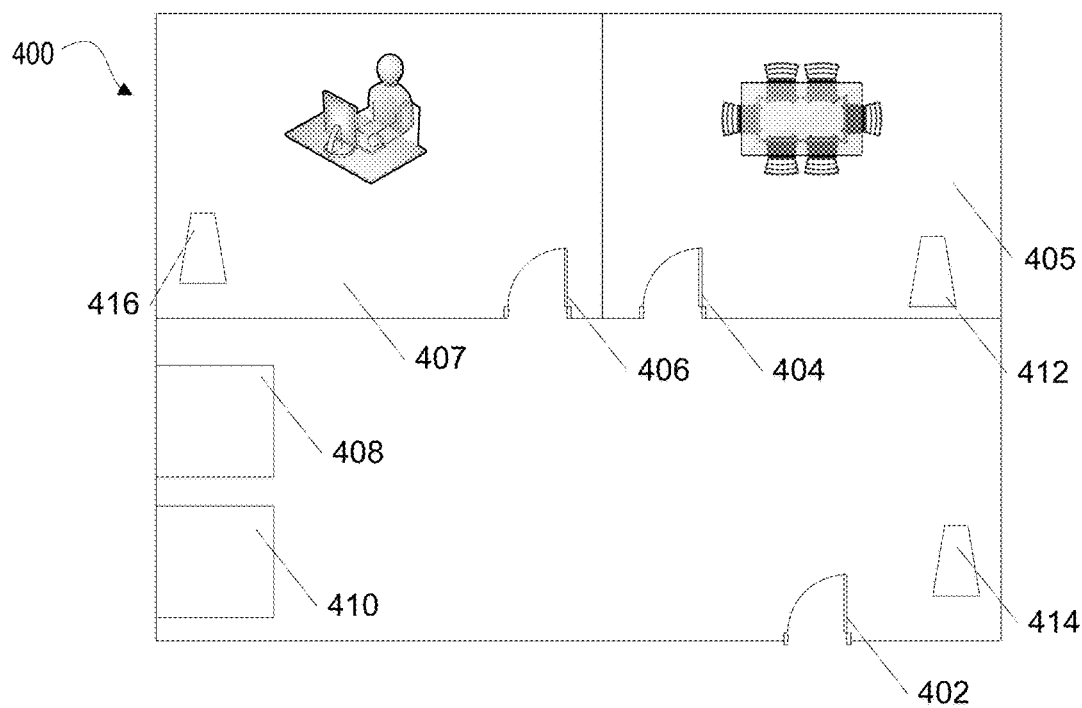
FIG. 4 is a schematic diagram of one example enterprise center that may implement one or more user customized access control functions according to one or more aspects described herein.

FIG. 4 illustrates one example enterprise center in which aspects described herein may be used. The example enterprise center 400 (e.g., an advanced center) shown in FIG. 4 is merely one example type of enterprise center and various other enterprise centers or types of enterprise centers (e.g., a vestibule with a single ATM, a branch or office location, or the like) may be used without departing from the invention.

The enterprise center 400 includes a first door 402 having a first locking mechanism and providing access to an interior of the enterprise center 400. Within the vestibule of the enterprise center are two ATMs 408 and 410. More or fewer ATMs may be provided without departing from the invention.

The enterprise center 400 further includes two enclosed rooms 405 and 407. Room 405 includes a second door 404 having a second locking mechanism and providing access from the vestibule to an interior of room 405. Room 407 includes a third door 406 having a third locking mechanism and providing access from the vestibule to an interior of room 407. Each of the first lock, second lock and third lock may be electronic locks controllable (e.g., configured to be activated or actuated) via electronic signal. In some examples, one or more first lock, second lock and third lock may include a secondary access device, such as an electronic access keypad, card reader, radio frequency identification tag, or the like, that may be provide access to one or more areas. In some examples, activating user preferences may override an authorized user access via the one or more secondary access devices.

In one example, a first user may arrive at enterprise center 400 and may be detected by the user customized access control computing platform 110 and/or device connected thereto. In addition, as the user moves through the enterprise center 400, a sub-location of the user may be determined based on user device detection of one or more of location beacons 412, 414, and 416. The location beacon detected by the user device may indicate a sub-location of the user in the vestibule (beacon 414), room 405 (beacon 412) or room 407 (beacon 414).

In some examples, each location beacon (e.g., location beacon 412, location beacon 414, and location beacon 416 may be configured to transmit one or more radio signals that may be detected and/or received by other devices located in close proximity of and/or otherwise within a predetermined distance of the particular location beacon. In one or more examples, any and/or all of the location beacons described (e.g., location beacon 412, location beacon 414, and location beacon 416) may implement Bluetooth™ Low Energy (also referred to as "Bluetooth™ LE," "Bluetooth™ Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it is located at and/or near the specific location (e.g., a sub-location) where the location beacon is positioned.

For example, in one or more arrangements discussed below, the one or more location beacons (e.g., location beacon 412, location beacon 414, and location beacon 416) may be positioned at various points within the enterprise center illustrated in FIG. 4. For example, beacon 412 may be in conference room 405, beacon 414 may be in the vestibule where one or more self-service kiosks may be arranged, and beacon 416 may be in conference or video-chat enabled room 407. Each location beacon may transmit a radio signal that may be detected and/or received by other devices at enterprise center 400, such as user computing device such as a mobile device, wearable device, or the like, which may enable such devices to determine that they are present at enterprise center 400 and/or located at and/or near a particular area or sub-location of enterprise center 400.

Upon detecting the user and obtaining location and sub-location information as discussed herein, one or more user preferences may be retrieved (e.g., upon determining that enterprise center 400 permits customized user access preferences). Upon retrieving the user preferences, an instruction to execute the user preferences may be transmitted to an internal access control computing system 120 for execution. For instance, an internal access control computing system 120 (which may, for example, be housed in an ATM 408, 410 or other computing device within the enterprise center 400) may receive and execute the instruction to lock or unlock one or more doors based on the user access preferences.

For instance, a default setting may be to maintain all doors as unlocked during normal business hours at enterprise center 400. However, if a first user is detected and the first user preferences indicate that he or she would prefer to have a door to an interior room locked to prevent access from the vestibule but permit egress from the room, the system may retrieve the preferences of the user, determine the sub-location of the user in one of rooms 405 and 407, and transmit an instruction to lock door 404 or 406 depending on which sub-location (e.g., room 405 or 407) the user is using. Upon receiving an indication that the user is finished, the default settings may be executed to unlock all doors during business hours.

In another example, a second user may have access preferences indicating that when he or she is in the vestibule, doors to both rooms 405 and 407 should remain locked to ensure no one enters those rooms while he or she is in the vestibule. Accordingly, the instruction may lock doors 404 and 406 until the second user is finished and default settings will return and the doors will be unlocked to permit access to rooms 405 and 407, respectively.

These example arrangements are merely some examples, and additional user access preferences may be pre-stored without departing from the invention. For instance, in some examples, a user may specify different access preferences for different times of day, for enterprise centers in different or specific geographic areas, or the like.

Figure 5:
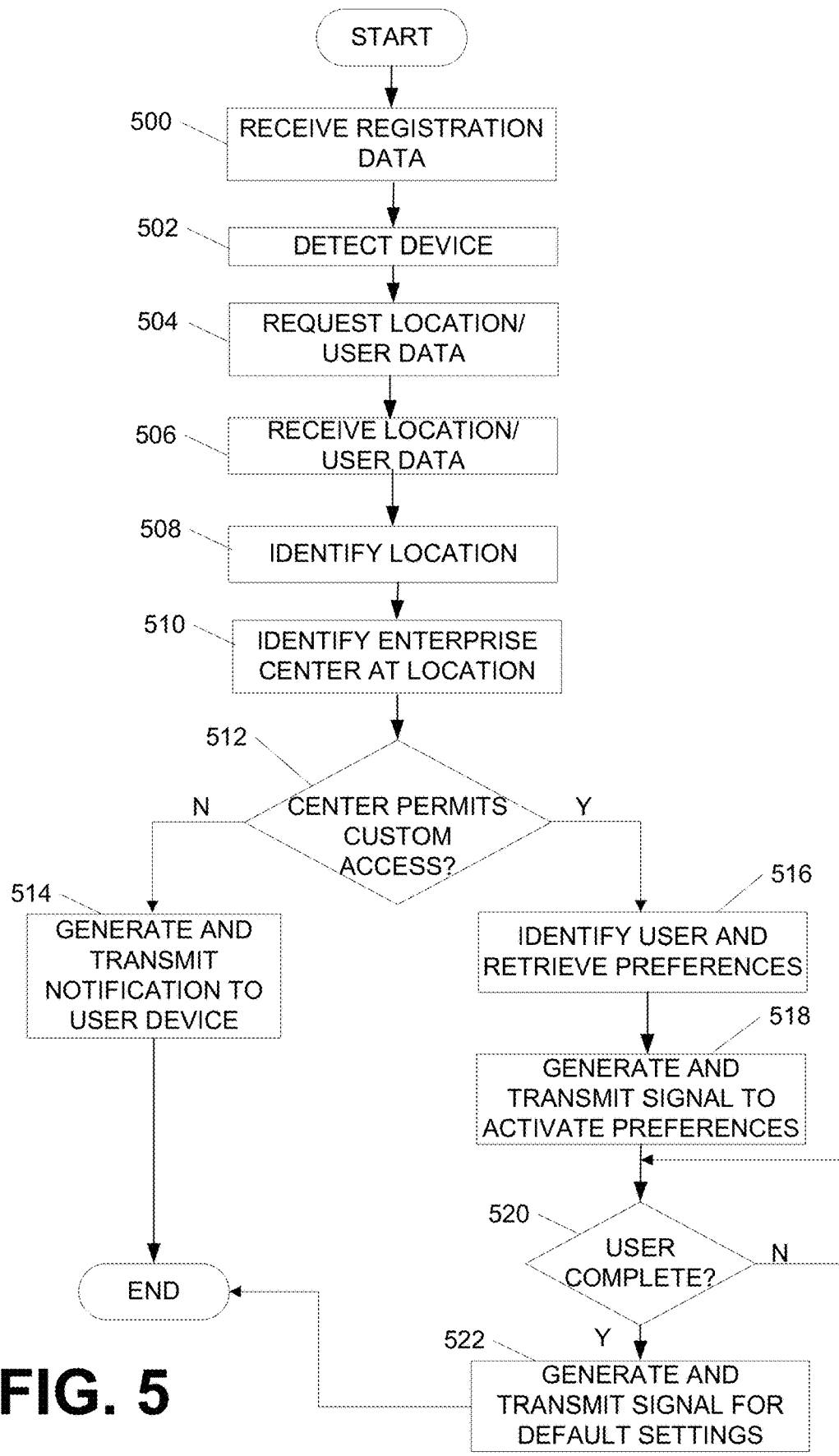
FIG. 5 depicts an illustrative method for implementing and using user customized access control functions according to one or more aspects described herein.

FIG. 5 is a flow chart illustrating one example method of implementing user customized access controls according to one or more aspects described herein. The processes illustrated in FIG. 5 are merely some example processes and functions. The steps shown may be performed in the order shown, in a different order, more steps may be added, or one or more steps may be omitted, without departing from the invention.

In some examples, one or more aspects, steps or processes described with respect to FIG. 5 may be performed in real-time.

At step 500, registration data may be received. For instance, registration data may be received from a user device, such as remote user computing device 170, and may include data associated with the user device, with the user, with user access preferences, and the like. The registration data may then be stored for future user in customizing access controls.

At step 502, a user device, such as a registered user device may be detected. In some examples, the user device may be detected by scanning an area around an enterprise center to detect signals emitted from a user device that may be recognized by the system. As discussed herein, detection of the user device may be performed using geo-sensing, near field communication, Bluetooth™ or WiFi detection, via location beacons, and the like.

At step 504, user data and location data may be requested from the detected user device. For instance, a request to provide current geographic location data and user data may be generated and transmitted to the user device.

At step 506, location response data and user response data may be received from the user device. In some examples, the location response data may include address data, longitude and latitude of current location, or the like. The user response data may include data identifying the user associated with the detected user device (e.g., by name, username, or other identifier).

At step 508, the location response data may be analyzed to determine a current geographic location of the user. At step 510, the determined current geographic location may be analyzed to identify an enterprise center at or near (e.g., within a predefined proximity of) the determined geographic location.

At step 512, the identified enterprise center may be evaluated to determine a type of enterprise center and to determine whether that enterprise center or type of enterprise center permits customized user access controls. If not, a notification indicated that customized user access controls are not permitted may be generated and transmitted to the user device at step 514.

If, at step 512, the enterprise center does permit customized user access controls, the user response data may be analyzed to identify a user and retrieve pre-stored user access preferences at step 516. For instance, one or more user access preferences may be retrieved from, for instance, the pre-stored registration data.

At step 518, one or more signals, instructions or commands to activate or actuate one or more electronic locks at the enterprise center to permit or deny access to one or more areas may be generated and transmitted to, for instance, an internal access control computing system 120. The instruction, signal or command may be executed to lock or unlock (e.g., activate or actuate one or more locks on one or more doors) to permit or deny access to one or more areas via one or more doors or other access devices.

At step 520, a determination may be made as to whether the user has completed his or her function at the enterprise center (e.g., that the user device is no longer at the enterprise center or an indication that the user will be leaving the enterprise center). For instance, a determination may be made as to whether user input has been received indicated the user is finished or has left the enterprise center, a communication session or wireless connection may be terminated, or the like. If not, the process may return to step 520 to re-evaluate whether an indication of user completion has been received.

If, at step 520, an indication of user completion has been received, an instruction, signal or command returning one or more locks to default settings may be generated and transmitted to the internal access control computing system 120 for execution and activation/deactivation of one or more locks or customized access settings.

Aspects described herein provide real-time, dynamic device detection and execution of user access control preferences. As discussed herein, the arrangements described provide for customized control of access to an enterprise center, or portion of an enterprise center, while a user is at the enterprise center. Accordingly, a user may customize a level of privacy provided.

In some examples, these arrangements may be used at, for instance, advanced centers that may include a vestibule having one or more ATMs or other self-service kiosks, as well as one or more interior rooms having a door to provide access from the vestibule. In some examples, these doors may default to an unlocked arrangement. However, a user may desire to have the doors lock (e.g., to a person attempting to enter the room from outside the room) to prevent access to unauthorized users. The doors may always remain unlocked to those inside the room to enable egress from the room.

In some arrangements, a user may store access preferences based on type of enterprise center, sub-location within an enterprise center, time of day, location of enterprise center, and the like. For instance, in some arrangements, an advanced center may be staffed (e.g., have a customer service agent available on site) for a portion of a day (e.g., during normal business hours). Accordingly, a user may have different access preferences (e.g., may desire to lock or unlock doors to one or more areas) when the advanced center is staffed (e.g., during business hours) than when it is unstaffed (e.g., outside of normal business hours).

The arrangements discussed herein are performed for registered users who have provided pre-stored user access preferences. The customized user access preferences may be evaluated prior to storage to ensure compliance with all local zoning laws.

In some examples, arrangements discussed herein may be used to detect unauthorized activity. For instance, if a user device is reported stolen and then is detected at an enterprise center, law enforcement may be dispatched to the enterprise center to investigate the issue. In another example, if a device is detected at a particular enterprise location for an extended period of time (e.g., a threshold time over a typical time spent at the location) a staff member or law enforcement may be dispatched to investigate. In yet another example, if potential unauthorized use is detected (e.g., a withdrawal made using a stolen ATM card, or the like) law enforcement may be contacted.

In some arrangements, device detection may be used to implement one or more other functions in addition to customized user access controls. For instance, as a user approaches a vestibule, if the registered device is detected, the system may automatically unlock the vestibule door to enable access to the user (e.g., if another user is not inside the vestibule). In another example, detection of the registered device may authenticate the user to an ATM or other self-service kiosk, or may provide a first layer of authentication for the user.

As discussed herein, various electronic locking devices may be used to lock or secure one or more doors providing access to an enterprise center or to a space within the enterprise center. The electronic locking devices (e.g., locks controlled electronically) may be controlled via one or more computing devices, such as internal access control computing system 120. Accordingly, devices in communication with internal access control computing system 120 may transmit instructions to lock or unlock a door (e.g., activate or deactivate a lock on a door) in accordance with the pre-stored user preferences.

In some examples, a registered user may attach other authorized user to his or her registration record in order to implement one or more access preferences for that user. For instance, a parent may identify user access preferences that should be initiated upon detection of a child's user device. The access preferences initiated upon detection of the child's device may be different from those of the parent user. In some examples, the user may indicate preferences to only permit actions to be initiated upon detection of both the parent device and the child device (e.g., a child cannot withdraw funds to take action without a parent present). In some examples, detection of a registered device associated with a secondary user (e.g. child) may prompt generation and transmission of a notification of the detected device to the primary user (e.g., parent).

In some arrangements, biometric data may be used in conjunction with device detection to authenticate a user, identify user preferences, enable additional functionality, or the like.

Figure 6:
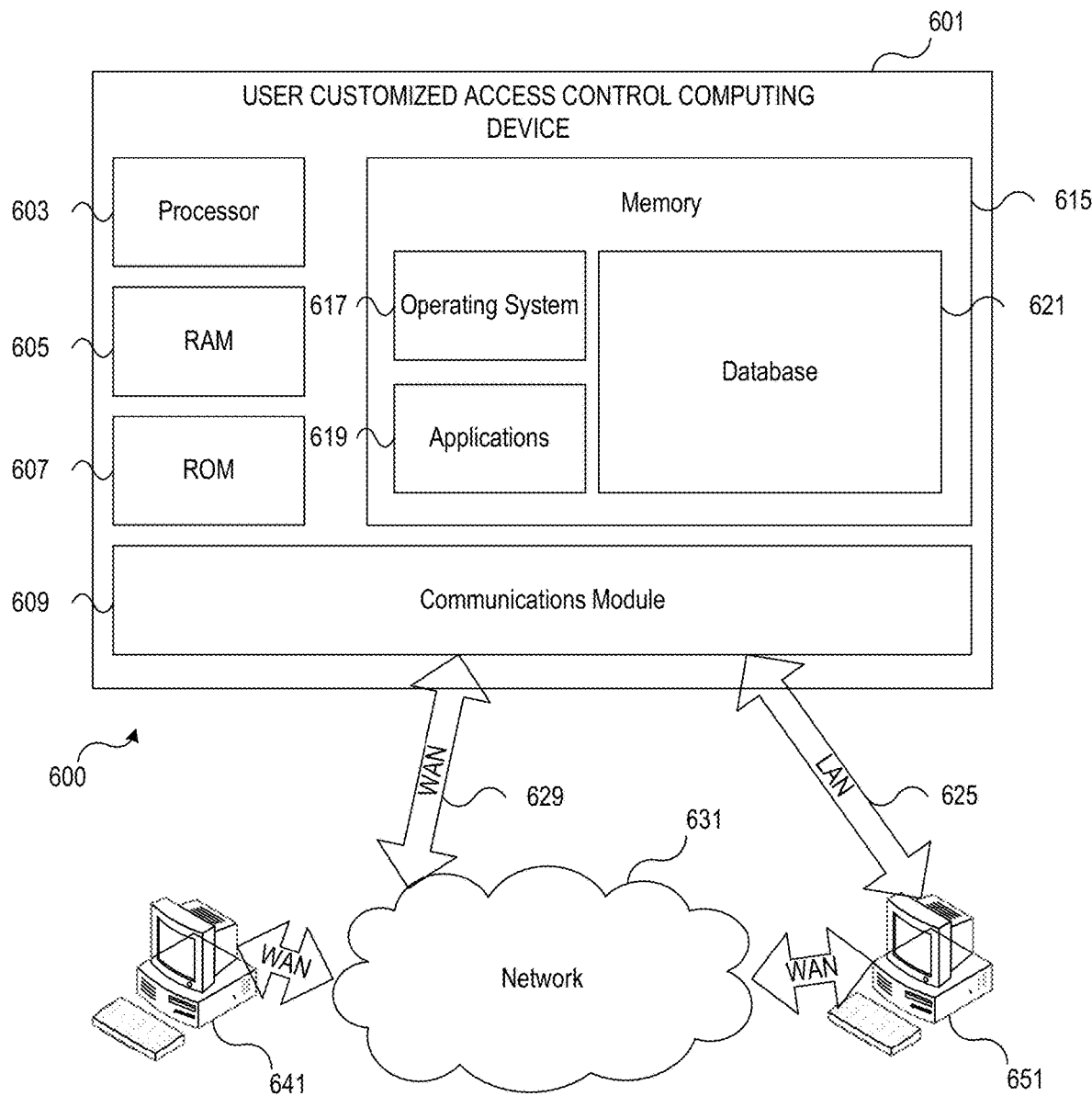
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include user customized access control computing device 601 having processor 603 for controlling overall operation of user customized access control computing device 601 and its associated components, including Random Access Memory (RAM) 605, Read-Only Memory (ROM) 607, communications module 609, and memory 615. User customized access control computing device 601 may include a variety of computer readable media. Computer readable media may be any available media that may be accessed by user customized access control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by user customized access control computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on user customized access control computing device 601. Such a processor may execute computer-executable instructions stored on a computer-readable medium.

Software may be stored within memory 615 and/or storage to provide instructions to processor 603 for enabling user customized access control computing device 601 to perform various functions as discussed herein. For example, memory 615 may store software used by user customized access control computing device 601, such as operating system 617, application programs 619, and associated database 621. Also, some or all of the computer executable instructions for user customized access control computing device 601 may be embodied in hardware or firmware. Although not shown, RAM 605 may include one or more applications representing the application data stored in RAM 605 while user customized access control computing device 601 is on and corresponding software applications (e.g., software tasks) are running on user customized access control computing device 601.

Communications module 609 may include a microphone, keypad, touch screen, and/or stylus through which a user of user customized access control computing device 601 may provide input, and may also include one or more of a speaker for providing audio output and a video display device for providing textual, audiovisual and/or graphical output. Computing system environment 600 may also include optical scanners (not shown).

User customized access control computing device 601 may operate in a networked environment supporting connections to one or more remote computing devices, such as computing devices 641 and 651. Computing devices 641 and 651 may be personal computing devices or servers that include any or all of the elements described above relative to user customized access control computing device 601.

The network connections depicted in FIG. 6 may include Local Area Network (LAN) 625 and Wide Area Network (WAN) 629, as well as other networks. When used in a LAN networking environment, user customized access control computing device 601 may be connected to LAN 625 through a network interface or adapter in communications module 609. When used in a WAN networking environment, user customized access control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
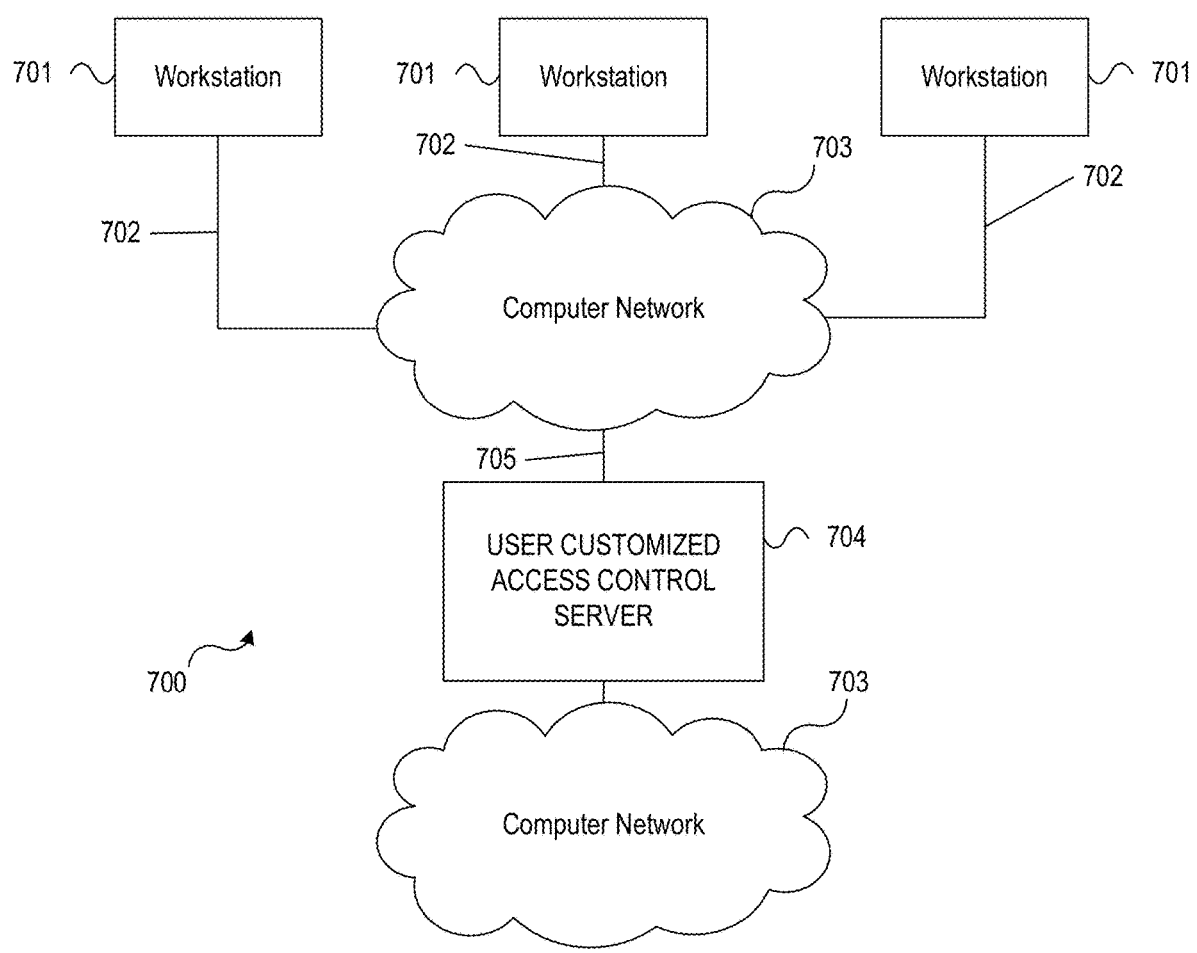
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to user customized access control server 704. In system 700, user customized access control server 704 may be a server, processor, computer, or data processing device, or combination of the same, configured to perform the functions and/or processes described herein. Server 704 may be used to receive registration information, detect devices, receive and analyze user and/or location data, identify an enterprise center, evaluate an enterprise center, retrieve user preferences, generate instructions based on user preferences, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and user customized access control server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   transmit, to a user device, a request for location and user data;
   receive, from the user device and in real-time, location response data and user response data;
   analyze, in real-time, the location response data to identify a current geographic location of the user device;
   identify, based on the analyzed location response data, an enterprise center at the current geographic location of the user device;
   evaluate the identified enterprise center to determine whether the enterprise center permits customized user access control;

responsive to determining that the enterprise center does not permit customized user access control:
maintain default access control settings at the enterprise center;
generate a notification indicating that the enterprise center does not permit customized user access control; and
transmit the generated notification to the user device;
responsive to determining that the enterprise center does permit customized user access control:
identify, based on the user response data, pre-stored user access preferences for locking or unlocking at least one door at the enterprise center;
generate, based on the user access preferences, an instruction to lock or unlock at least one door at the enterprise center; and
transmit the instruction to an internal access control computing system at the enterprise center to lock or unlock at least one door at the enterprise center.

2. The computing platform of claim 1, wherein identifying the pre-stored user access preferences for locking or unlocking at least one door at the enterprise center is further based on a type of enterprise center and wherein the type of enterprise center is one of: an office location, a vestibule with at least one self-service kiosk located therein, and an advance center including at least one self-service kiosk and at least one interior room with an access door.

3. The computing platform of claim 1, wherein the generated instruction includes a signal to actuate an electronic lock.

4. The computing platform of claim 1, further including instructions that, when executed, cause the computing platform to:
identify, based on detection of a signal emitted from a location beacon of a plurality of location beacons at the enterprise center, a sub-location of the user device within the enterprise center, and
wherein the identifying pre-stored user access preferences is further based on the identified sub-location of the user device.

5. The computing platform of claim 1, further including instructions that, when executed, cause the computing platform to:
receive an indication that the user device is no longer at the enterprise center;
responsive to receiving the indication that the user device is no longer at the enterprise center, generate an instruction to return one or more locks to a default setting; and
transmit the instruction to return the one or more locks to a default setting to the internal access control computing system.

6. The computing platform of claim 5, wherein the indication that the user device is no longer at the enterprise center includes user input received by the user device and transmitted to the computing platform.

7. The computing platform of claim 1, wherein the indication that the user device is no longer at the enterprise center includes termination of a wireless connection between the user device and the computing platform.

8. A method, comprising:
by a computing platform comprising at least one processor, memory, and a communication interface:
transmitting, by the at least one processor and to a user device via the communication interface, a request for location and user data;
receiving, in real-time, by the at least one processor and from the user device, location response data and user response data;
analyzing, in real-time and by the at least one processor, the location response data to identify a current geographic location of the user device;
identifying, by the at least one processor and based on the analyzed location response data, an enterprise center at the current geographic location of the user device;
evaluating, by the at least one processor, the identified enterprise center to determine whether the enterprise center permits customized user access control;
responsive to determining that the enterprise center does not permit customized user access control:
maintaining, by the at least one processor, default access control settings at the enterprise center;
generating, by the at least one processor, a notification indicating that the enterprise center does not permit customized user access control; and
transmitting, by the at least one processor and via the communication interface, the generated notification to the user device;
responsive to determining that the enterprise center does permit customized user access control:
identifying, by the at least one processor and based on the user response data, pre-stored user access preferences for locking or unlocking at least one door at the enterprise center;
generating, by the at least one processor and based on the user access preferences, an instruction to lock or unlock at least one door at the enterprise center; and
transmitting, by the at least one processor and via the communication interface, the instruction to an internal access control computing system at the enterprise center to lock or unlock at least one door at the enterprise center.

9. The method of claim 8, wherein identifying the pre-stored user access preferences for locking or unlocking at least one door at the enterprise center is further based on a type of enterprise center and wherein the type of enterprise center is one of: an office location, a vestibule with at least one self-service kiosk located therein, and an advance center including at least one self-service kiosk and at least one interior room with an access door.

10. The method of claim 8, wherein the generated instruction includes a signal to actuate an electronic lock.

11. The method of claim 8, further including:
identifying, by the at least one processor and based on detection of a signal emitted from a location beacon of a plurality of location beacons at the enterprise center, a sub-location of the user device within the enterprise center, and
wherein the identifying pre-stored user access preferences is further based on the identified sub-location of the user device.

12. The method of claim 8, further including:
receiving, by the at least one processor, an indication that the user device is no longer at the enterprise center;
responsive to receiving the indication that the user device is no longer at the enterprise center, generating, by the at least one processor, an instruction to return one or more locks to a default setting; and
transmitting, by the at least one processor, the instruction to return the one or more locks to a default setting to the internal access control computing system.

13. The method of claim 12, wherein the indication that the user device is no longer at the enterprise center includes user input received by the user device and transmitted to the computing platform.

14. The method of claim 8, wherein the indication that the user device is no longer at the enterprise center includes termination of a wireless connection between the user device and the computing platform.

15. One or more non-transitory computer-readable media storing instructions that, when executed by a computing platform comprising at least one processor, memory, and a communication interface, cause the computing platform to:
transmit, to a user device, a request for location and user data;
receive, from the user device and in real-time, location response data and user response data;
analyze, in real-time, the location response data to identify a current geographic location of the user device;
identify, based on the analyzed location response data, an enterprise center at the current geographic location of the user device;
evaluate the identified enterprise center to determine whether the enterprise center permits customized user access control;
responsive to determining that the enterprise center does not permit customized user access control:
maintain default access control settings at the enterprise center;
generate a notification indicating that the enterprise center does not permit customized user access control; and
transmit the generated notification to the user device;
responsive to determining that the enterprise center does permit customized user access control:
identify, based on the user response data, pre-stored user access preferences for locking or unlocking at least one door at the enterprise center;
generate, based on the user access preferences, an instruction to lock or unlock at least one door at the enterprise center; and
transmit the instruction to an internal access control computing system at the enterprise center to lock or unlock at least one door at the enterprise center.

16. The one or more non-transitory computer-readable media of claim 15, wherein identifying the pre-stored user access preferences for locking or unlocking at least one door at the enterprise center is further based on a type of enterprise center and wherein the type of enterprise center is one of: an office location, a vestibule with at least one self-service kiosk located therein, and an advance center including at least one self-service kiosk and at least one interior room with an access door.

17. The one or more non-transitory computer-readable media of claim 15, wherein the generated instruction includes a signal to actuate an electronic lock.

18. The one or more non-transitory computer-readable media of claim 15, further including instructions that, when executed, cause the computing platform to:
identify, based on detection of a signal emitted from a location beacon of a plurality of location beacons at the enterprise center, a sub-location of the user device within the enterprise center, and
wherein the identifying pre-stored user access preferences is further based on the identified sub-location of the user device.

19. The one or more non-transitory computer-readable media of claim 15, further including instructions that, when executed, cause the computing platform to:
receive an indication that the user device is no longer at the enterprise center;
responsive to receiving the indication that the user device is no longer at the enterprise center, generate an instruction to return one or more locks to a default setting; and
transmit the instruction to return the one or more locks to a default setting to the internal access control computing system.

20. The one or more non-transitory computer-readable media of claim 19, wherein the indication that the user device is no longer at the enterprise center includes user input received by the user device and transmitted to the computing platform.

21. The one or more non-transitory computer-readable media of claim 15, wherein the indication that the user device is no longer at the enterprise center includes termination of a wireless connection between the user device and the computing platform.

* * * * *